E. R. MATTERS.
EYEGLASS CHAIN ATTACHMENT.
APPLICATION FILED DEC. 10, 1909.
970,853.
Patented Sept. 20, 1910.
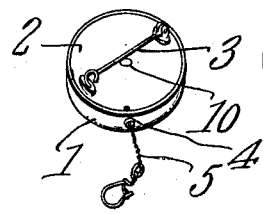
Fig. 1.
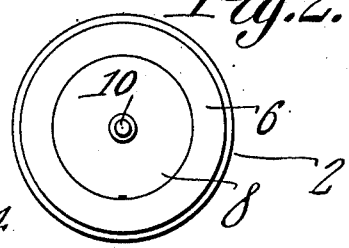
Fig. 2.
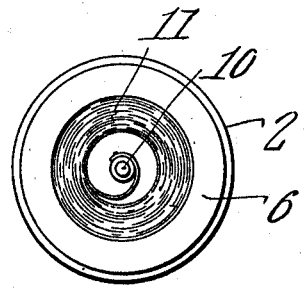
Fig. 3.
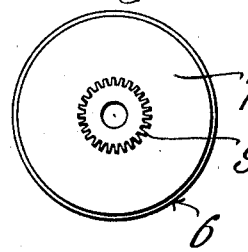
Fig. 4.
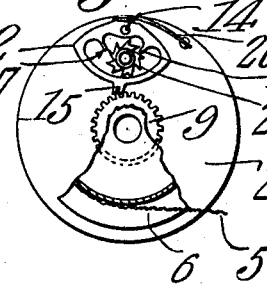
Fig. 5.
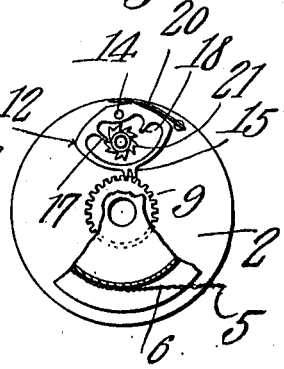
Fig. 6.
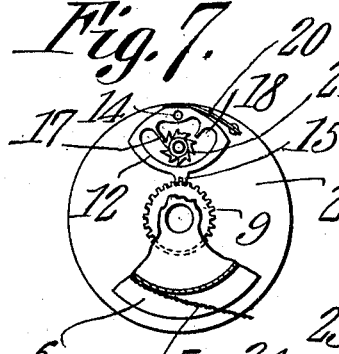
Fig. 7.
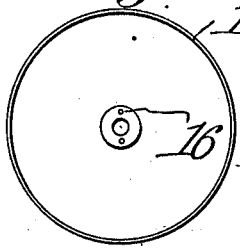
Fig. 8.
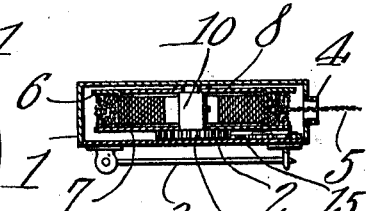
Fig. 9.
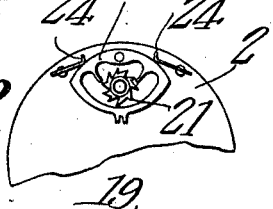
Fig. 12.
Fig. 10.
Fig. 11.
Witnesses
Mason B. Lawton
Inventor
Edward R. Matters.
By C. A. Snow & Co.
Attorneys
THE NORRIS PETERS CO., WASHINGTON, D. C.

UNITED STATES PATENT OFFICE.

EDWARD R. MATTERS, OF NEOSHO, MISSOURI, ASSIGNOR TO AMERICAN OPTICAL COMPANY, A CORPORATION OF MASSACHUSETTS.

EYEGLASS-CHAIN ATTACHMENT.

970,853.  Specification of Letters Patent.  Patented Sept. 20, 1910.

Application filed December 10, 1909. Serial No. 532,412.

*To all whom it may concern:*

Be it known that I, EDWARD R. MATTERS, a citizen of the United States, residing at Neosho, in the county of Newton and State of Missouri, have invented a new and useful Eyeglass-Chain Attachment, of which the following is a specification.

The device forming the subject matter of this application, is adapted to be employed, primarily, although not exclusively, for the manipulation of a cord or chain, whereby a pair of nose glasses are connected with the person of the user.

It is the object of the invention to provide a novel means for reeling in and out, the attaching cord of a pair of glasses, to adjust the length thereof, novel means being provided for locking the parts of the device in a fixed position at will, to adjust the length of the cord.

With these and other objects in view, the invention consists in the novel construction and arrangement of parts hereinafter described, delineated in the drawings, and specifically claimed, it being understood that changes, properly falling within the scope of what is claimed, may be made, without departing from the spirit of the invention.

Similar numerals of reference are employed to denote corresponding parts throughout the several figures of the drawings.

In the accompanying drawings:—Figure 1 is a perspective, giving a rear view of the invention; Fig. 2 is an elevation of the device showing one face of the winding drum; parts being removed; Fig. 3 is an elevation of the device showing one face of the winding drum, a portion of the device shown in Fig. 2 being removed in order to reveal the internal construction of the device; Fig. 4 is an elevation of the winding drum, showing the opposite face of the winding drum from that disclosed in Fig. 3; Fig. 5 is an elevation of the lid and its attendant parts, parts being broken away, the view showing the positions which the parts will assume while the chain is being drawn out; Fig. 6 is a similar view showing the positions which the parts will assume while the chain is being reeled in; Fig. 7 is a similar view showing the positions which the parts will assume when the chain is held locked, at a given length; Fig. 8 is an elevation looking into the interior of the casing which holds the movable parts of the device; Fig. 9 is a transverse section; Fig. 10 is an elevation of the ratchet wheel; Fig. 11 is an elevation of the pawl; and Fig. 12 is an elevation of the lid and its attendant parts, after the showing of Figs. 5 and 7, the view illustrating a modification of the invention.

In carrying out the invention, there is provided, as a fundamental element, a casing 1, preferably circular in contour. One side of this casing is closed by a lid 2 which constitutes a support for certain of the portions of the structure. Mounted upon the outer face of the lid 2, is a hinged pin 3, whereby the device may be assembled with the garments of the user, and in the periphery of the casing 1, there is an eyelet 4 adapted to receive the chain 5 whereby the eye-glasses are carried. The lid 2 is provided with a centrally disposed shaft 10, the free end of which is received in the central opening of a ring 16 let into the inner face of the casing 1, as shown in Fig. 8.

Mounted for rotation upon the shaft 10, and substantially filling the interior of the casing 1, is a drum 6, open in its interior, and provided with an integrally formed side wall 7, and with a lid 8 which closes the interior of the drum. Disposed in the interior of the drum is a coiled spring 11, one end of which is secured to the shaft 10, the other end thereof being secured to the drum, access being had to the spring 11 by removing the lid 8. Upon this drum 6, the chain 5 is wound.

Secured to the wall 7 of the drum is a pinion 9. This pinion 9 is in mesh with a rack 15 located upon one edge of a centrally open pawl 12, pivotally connected with the lid 2 at 14. A tooth 17 projects into the interior of the pawl 12 from one side thereof, and a tooth 18 projects into the interior of the pawl from the opposite side thereof. Adjacent its pivotal mounting 14, the pawl 12 is flattened upon its outer edge, as denoted by the numeral 19, and against this flat portion 19 bears one end of a spring 20, the other end of which is secured to the lid 2.

Mounted for rotation upon lid 2, within the contour of the pawl 12, is a ratchet wheel 21, which, as shown in Fig. 10, is provided with shallow indentations 22, alternating with deeper indentations 23. In Fig. 12 of the drawings a slight modification of the invention is shown, the modification consisting in dispensing with the flattened portion 19 of the pawl, and in providing two oppositely disposed springs 24 adapted to bear against the edge of the modified pawl 25, which said edge is rounded, instead of flattened as at 19, adjacent the pivot of the pawl.

I will now explain the manner in which the several parts hereinbefore described, coöperate in the operation of the structure.

Referring to Fig. 7 of the drawings, the parts are shown in the positions which they will assume when the chain 5 has been run out to the desired degree, the drum being locked in a fixed position, and the spring 11 being under tension. The tendency of the spring 11 is to rotate the drum 6 clockwise, called that an opposite side of the drum is wise, and in this connection it should be reshown in Fig. 7, from that shown in Fig. 3. This tendency of the spring 11 to rotate the drum 6 clockwise, is resisted by the engagement between the rack 15 and the pinion 9, the pawl 12 being prevented from swinging counter-clockwise and setting the drum free, by the tooth 17 of the pawl, which is in engagement with one of the shallow indentations 22 of the ratchet wheel 21.

Let it be supposed that it is desired to shorten the chain 5. The parts being in the positions shown in Fig. 7, the chain is first drawn out still farther, say half an inch. This continued drawing out of the chain will rotate the drum 6 counter clockwise, the pinion 9 being rotated in the same direction. This counter clockwise rotation of the pinion 9 will cause the rack 15 to move clockwise, positioning the parts as shown in Fig. 5, the tooth 17 being lifted out of the shallow indentation 22 of the ratchet wheel 21 in which it is shown to be engaged in Fig. 7. The rack 15 will now click over the pinion 9 as long as the chain 5 is being drawn out, the spring 20 bearing upon the portion 19 of the pawl, and serving to hold the rack 15 against the pinion 9 as the latter rotates counter clockwise. When the pawl 12 is thus tilted from the position shown in Fig. 7 to that shown in Fig 5, the tooth 18 will engage one of the indentations of the ratchet wheel 21 and rotate the ratchet wheel clockwise, so that when the tooth 17 is lowered, it will engage, not one of the shallow indentations 22 of the ratchet wheel 21, but, one of the deeper indentations 23 therein.

After the chain 5 has been pulled out a half inch or so; it is slacked. When the chain is slacked, the spring 11 will start a clockwise rotation in the drum 6, reeling up the chain. This clockwise rotation in the drum 6 will cause a clockwise rotation in the pinion 9, the rack 15 moving counter-clockwise from the position shown in Fig. 5, to that shown in Fig. 6. Owing to the fact that one of the deeper indentations 23 is now positioned to engage the tooth 17, the parts will not be locked as shown in Fig. 7, the rack 15, moving counter-clockwise as shown in Fig. 6, in which position it will click over the pinion 9, the spring 20 exercising its function, as before. When the chain 5 has thus been reeled upon the drum to the desired degree, the chain is stopped and pulled out for a half an inch, or less, causing the parts to move from the positions shown in Fig. 6 to those shown in Fig. 5, with this exception; when the pawl 12 thus swings from the position of Fig. 6 to the position of Fig. 5, the tooth 18, engaging the ratchet wheel 21, will rotate the latter clockwise, so that the succeeding, shallow indentation 22 will be presented to receive the tooth 17. When the chain is released, the tooth 17 will drop into the shallower indentation thus presented, locking the parts as shown in Fig. 7.

Obviously, when the parts are disposed as shown in Fig. 5, the chain may be run out to any desired length, and likewise, when the parts are disposed as shown in Fig. 6, the chain may be wound upon the drum throughout its entire length if desired.

The foregoing description of the operation of the device is necessary to a clear understanding of the operation of the several parts, but in practical operation, the chain will be simply unwound from the drum to the desired length, and then jerked slightly once or twice, till the tooth 17 catches in one of the shallower indentations 22 of the ratchet wheel 21, whereupon the chain will be locked substantially at the length to which it has been extended.

Having thus described the invention what is claimed is:—

1. A device of the class described comprising a support; a winding drum mounted for rotation adjacent the support; means for actuating the drum; a pinion secured to the drum; a centrally open pawl pivoted to the support and having a rack to mesh with the pinion; and means mounted upon the support within the contour of the pawl and engageable by the pawl, for locking the rack in engagement with the pinion.

2. A device of the class described comprising a support; a winding drum mounted for rotation adjacent the support; means for actuating the drum; a pinion secured to the drum; a centrally open pawl pivoted to the support and having a rack to mesh with the pinion; and means movably mounted upon the support within the contour of the pawl and engageable by the pawl, for locking the rack in engagement with the pinion, the pawl being movable to dispose said means in a position inoperative to lock the rack in engagement with the pinion.

3. A device of the class described comprising a support; a winding drum mounted for rotation adjacent the support; means for actuating the drum; a pinion secured to the drum; a centrally open pawl pivoted to the support and having a rack to mesh with the pinion; and a ratchet wheel rotatably mounted upon the support within the contour of the pawl and engageable by the pawl, to lock the rack in engagement with the pinion.

4. A device of the class described comprising a support; a winding drum mounted for rotation adjacent the support; means for actuating the drum; a pinion secured to the drum; a centrally open pawl pivoted to the support and having a rack to mesh with the pinion; and a ratchet wheel rotatably mounted upon the support within the contour of the pawl and having unequal indentations, the smaller of the indentations being engageable by the pawl to hold the rack in engagement with the pinion, and the larger of the indentations being engageable by the pawl to dispose the rack in unlocked position with respect to the pinion.

5. A device of the class described comprising a support; a winding drum mounted for rotation adjacent the support; means for actuating the drum; a pinion secured to the drum; a centrally open pawl pivoted to the support and having a rack to mesh with the pinion; a ratchet wheel rotatably mounted upon the support within the contour of the pawl, and having unequal indentations, the smaller indentations being engageable by the pawl to lock the rack in engagement with the pinion, and the larger of the indentations being engageable by the pawl to dispose the rack in unlocked position with respect to the pinion, the pawl having spaced teeth, one of which is arranged to engage the ratchet wheel to present the indentations thereof for successive engagement by the other tooth.

6. A device of the class described comprising a support; a centrally open pawl pivoted to the support; means mounted upon the support within the contour of the pawl for holding the pawl in a fixed position; and a winding device mounted for rotation adjacent the support and engageable by the pawl when the pawl is thus held.

7. A device of the class described comprising a support; a centrally open pawl pivoted to the support; means movably mounted upon the support within the contour of the pawl for holding the pawl in a fixed position; and a winding device mounted for rotation adjacent the support and engageable by the pawl when the pawl is thus held; said means being movable by the pawl to permit the pawl to pass beyond its fixed position.

8. A device of the class described comprising a support; a centrally open pawl pivoted to the support; a ratchet wheel rotatably mounted upon the support within the contour of the pawl, the wheel having indentations of different depths, the shallower of which are engageable by the pawl to hold the pawl in a fixed position, the deeper of which constitute a means for permitting the pawl to pass beyond its fixed position, the pawl having independent projecting parts adapted to alternately engage the indentations of the ratchet wheel at different times, to present the indentations for successive engagement by the other of said parts; and a winding device mounted for rotation adjacent the support and engageable by the pawl when the pawl is held in fixed position.

9. A device of the class described comprising a winding drum; means for actuating the drum; a pinion secured to the drum; a centrally opened pawl held for pivotal movement adjacent the drum and having a rack to mesh with the pinion; and means movably held within the contour of the pawl and engageable by the pawl, for locking the rack in engagement with the pinion.

In testimony that I claim the foregoing as my own, I have hereto affixed my signature in the presence of two witnesses.

EDWARD R. MATTERS.

Witnesses:
HUGH GARLAND BRICE,
WILEY E. SIMS.